United States Patent [19]

Seki et al.

[11] 4,342,576
[45] Aug. 3, 1982

[54] PARTICLE SEPARATOR

[75] Inventors: Masao Seki; Hideo Sato, both of Yokosuka, Japan

[73] Assignee: Ishikawajima-Harima Jukogyo Kabushiki Kaisha, Tokyo, Japan

[21] Appl. No.: 163,325

[22] Filed: Jun. 26, 1980

[51] Int. Cl.$^3$ ............................................. B01D 45/12
[52] U.S. Cl. ........................................ 55/452; 55/454; 55/459 R
[58] Field of Search .......................... 55/398, 450–452, 55/454, 459 R; 210/512.1

[56] References Cited

U.S. PATENT DOCUMENTS

| | | | |
|---|---|---|---|
| 460,061 | 9/1891 | Pratsch | 55/459 R |
| 1,031,862 | 7/1912 | Morse | 55/452 X |
| 1,513,528 | 10/1924 | Bamber | 55/398 |
| 1,919,653 | 7/1933 | Hill | 210/512.1 X |
| 2,152,114 | 3/1939 | Van Tongeren | 55/398 |
| 2,301,371 | 11/1942 | Corwin | 210/512.1 X |
| 4,094,794 | 6/1978 | Kahmann | 210/512.1 |

FOREIGN PATENT DOCUMENTS 51-95870 7/1976 Japan .

Primary Examiner—Kathleen J. Prunner
Attorney, Agent, or Firm—B. B. Olive

[57] ABSTRACT

A cyclone type particle separator comprising a lower cone with a particle outlet, an intermediate cylinder and an upper truncated cone. An inlet is opened at the intermediate cylinder tangentially or involutedly thereof and adjacent to the upper end of the lower cone so that the particle-laden gas can freely spiral upward in the intermediate cylinder and the upper truncated cone while the particles separated drop into the lower cone. The top wall of the upper truncated cone is spaced apart from the inlet by a suitable distance, and upper particle trapping chambers are extended tangentially and outwardly from the upper truncated cone and is contiguous with the top wall so that the particles separated in the upper truncated cone adjacent to the top wall thereof can be trapped and collected in the upper trapping chambers.

3 Claims, 7 Drawing Figures

PARTICLE SEPARATOR

BACKGROUND OF THE INVENTION

The present invention relates to an apparatus for separating particle-laden gas into a gas and particles which is especially adapted for removing dust from dust-laden gas or particularly adapted for use in a process for calcining cement or alumina particles.

For instance, in the cement calcination process, the cyclone as shown in FIG. 1 has been widely used for separating and heating particles of raw materials because of its high separation efficiency and simple construction. However, because of its underlying principle, the cyclone a has an inevitably high pressure loss. For instance, in the case of a single stage, the pressure loss ranges from 100 to 150 mmAq and in the case of a four serial stage, the pressure loss ranges from 400 to 600 mmAq. As a result, the power consumption of blowers and exhaust fans increases. In operation, a high temperature gas laden with particles flows through an inlet duct b tangentially into the cylindrical portion of the cyclone a at the inlet velocity of from 10 to 20 meters per second. Because the cylindrical portion has a top wall c and a gas outlet pipe d, the gas is forced to spiral downward along cylindrical and conical walls e and f while the particles, by virture of their inertia, are flung against them. Thereafter the gas spirals upward at the inside of the downward spiralling gas vortex and flows into the gas outlet pipe d. The pressure loss across the cyclone a is therefore mainly due to the energy loss due to the forced formation of this double vortex. In general, the pressure loss is in proportion to the square of the velocity of the gas at the inlet. It follows therefore that when the inlet velocity or head is extremely reduced to the order of less than 10 meters per second, the pressure loss can be considerably decreased, but the cyclone must be increased in size accordingly. Therefore this scheme is unsatisfactory in practice.

In view of the above, the primary object of the present invention is to provide a particle separator in which a top wall is spaced upwardly apart from an inlet by a suitable distance so that an upper space may be defined between the inlet and the top wall, whereby the pressure loss can be considerably reduced.

The present invention will become more apparent from the following description of a preferred embodiment thereof taken in conjunction with the accompanying drawings.

DETAILED DESCRIPTION OF THE PREFERRED EMBODIMENT

Figure 1:
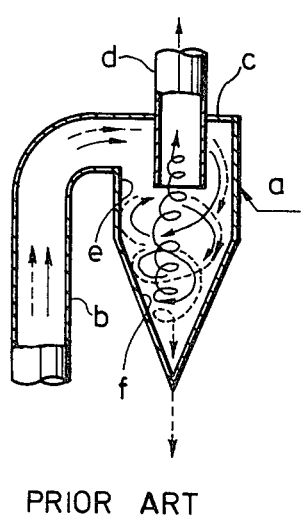
FIG. 1 is a schematic longitudinal sectional view of a prior art cyclone separator.
Figure 2:
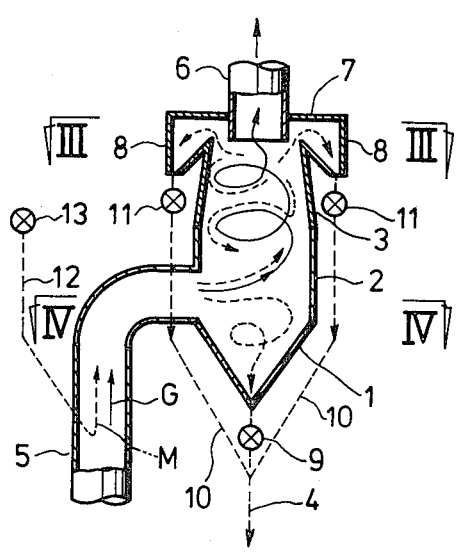
FIG. 2 is a schematic longitudinal sectional view of a preferred embodiment of the present invention.
Figure 3:
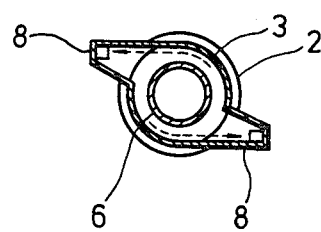
FIG. 3 is a cross sectional view taken along the line III—III of FIG. 2.
Figure 4:
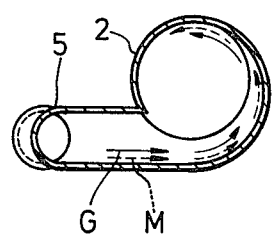
FIG. 4 is a cross sectional view taken along the line IV—IV of FIG. 2.

Referring to FIGS. 2 through 4, a cyclone in accordance with the present invention has a lower body 1, an intermediate body 2 and an upper body 3. The lower body 1 is in the form of a conical hopper having its outlet connected to a particle discharge chute 4 with a valve 9. The intermediate body 2 which is joined to the upper end of the lower body 1 is in the form of a cylinder, and an inlet duct 5 is connected to the intermediate body 2 tangentially or involutedly so that the particle-laden gas is forced to whirl. The upper body 3 which is joined to the upper end of the intermediate body 2 is frustoconical. The distance or height between the inlet 5 and the top wall 7 of the upper body 3 is greater than a quarter of the inner diameter of the intermediate cylinder 2. A gas outlet pipe 6 is extended through the top wall 7 coaxially thereof. As far as the cross section of the upper body 3 is circular, the upper body 3 may be a cylinder or a combination of a cylinder and a truncated cone. Upper particle trapping chambers 8 are extended tangentially and outwardly of the upper body 3 contiguous with the top wall 7 and are communicated with the upper body 3 through openings formed through the side wall thereof. The particles trapped in the upper particle trapping chambers 8 are discharged through particle discharge chutes 10 each including a valve 11. The particles are charged into the inlet duct 5 through a particle supply chute 12 including a valve 13. The solid-line arrows G indicate the flows of the gas while the dotted-line arrows M, the particles (of the raw materials).

Next the mode of operation of the particle separator with the above construction will be described. When the particle-laden gas flows through the inlet 5 into the intermediate body 2, it spirals or whirls as best shown in FIGS. 2 and 4. Part of the gas with the particles spirals upward along the inner wall surface of the upper body 3, forming a free vortex so that the particles are flung against the inner wall of the upper body 3 by virtue of their inertia and the centrifugal forces imparted thereto. While the gas free from the particles flows into the gas outlet pipe 6, the separated particles drop into the lower body 1 and then are discharged through the discharge chute 4.

The particles which are still entrained in the upwardly spirally gas are forced into the upper trapping chambers 8 by virtue of the centrifugal forces imparted thereto. The upper trapping chambers 8 serve as a reducer. The particles trapped in the upper particle trapping chambers 8 are discharged through the particle discharge chutes 10 into the discharge chute 4.

Next some applications of the particle separator described above with reference to FIGS. 2 through 4 will be described in conjunction with the cement calcination process.

Figure 5:
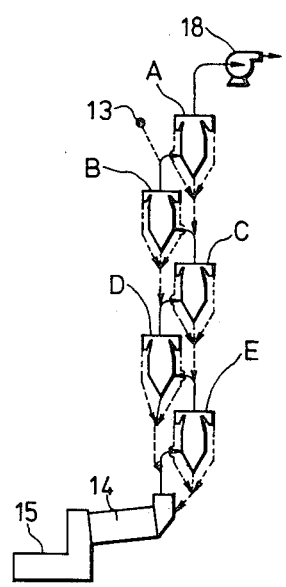
FIG. 5 shows a block diagram of a cement calcination apparatus incorporating the particle separators in accordance with the present invention.

In the process shown in FIG. 5, the particle separators A, B, C, D and E in five stages are used as the suspension heaters in which the cement raw materials are preheated by the exhaust gases discharged from a rotary kiln. The number of suspension preheaters can be increased or decreased as needs demand.

The high temperature exhaust gases discharged from the rotary kiln 14 flow through the suspension preheaters in the order of E, D, C, B and A and are discharged from the uppermost preheater A by an exhaust fan 18. The particles of raw materials are first charged into a duct interconnecting the preheaters A and B. The particles trapped at the upper and lower trapping chambers of the preheater A are charged into a duct interconnecting the preheater B and C. In like manner, the particles are circulated through the preheaters and finally charged into the rotary kiln 14 from the lowermost preheater E. The particles are calcined and clinker is cooled in a clinker cooler 15.

Figure 6:
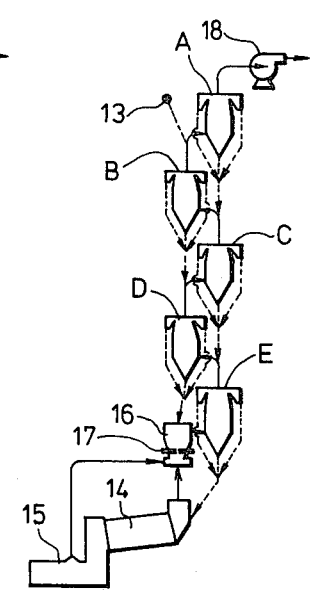
FIGS. 6 and 7 show further examples of cement calcination apparatus incorporating the particle separators of the present invention.

In the process shown in FIG. 6, the particle separators A through E are used as the so-called new suspension preheaters in which a calcining furnace 16 with a burner 17 is interposed between the rotary kiln and the lowermost stage E. The mode of operation of the process shown in FIG. 6 is substantially similar to that shown in FIG. 5 except that part of the preheated air from the cooler 15, the exhaust gases from the rotary kiln 14, part of the fuel supplied from the burner 17 and the preheated raw materials from the fourth stage D are introduced into the furnace 16 and then into the last stage E where the exhaust gases are charged into the fourth stage D while the preheated raw materials are charged into the rotary kiln 14.

Figure 7:
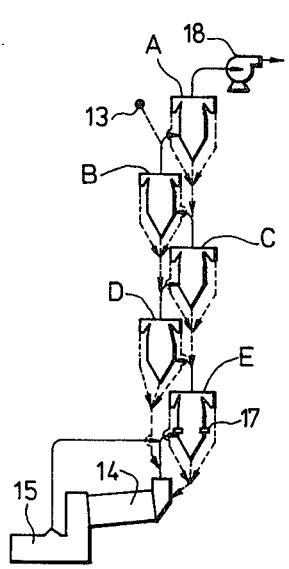

In the process shown in FIG. 7, the furnace 16 is eliminated and instead the burner 17 is attached to the last stage E so as to supply the fuel. Therefore the last stage E functions not only as a particle separator but also as a calcining furnace.

It is to be understood that in the processes shown in FIGS. 5, 6 and 7, any of the particle separators A through E, alone or in combination, can be replaced with prior art type cyclones or the like.

In summary, according to the present invention, the particle separator comprises a lower body, an intermediate body and an upper body joined securely in the order named. The inlet is opened into the middle body which is cylindrical and the top wall of the upper body is spaced upwardly apart from the inlet by a suitable distance. A gas outlet pipe is extended through the top wall of the upper body coaxially thereof. A suitable space is defined by the intermediate body or cylinder, the top wall of the upper body and the portion of the gas outlet pipe extending into the upper body. As a result, the particle-laden gas will not be forced to form a vortex, which results in a higher pressure loss. Therefore the pressure loss across the particle separator in accordance with the present invention is about one third as low as that of the prior art cyclone type dust separators. In addition, the particle separator includes the conical lower body with a particle outlet so that the collection efficiency is almost the same as that of the prior art cyclone type dust separators.

What is claimed is:

1. A particle separator for particle-laden gas, said separator having a lower body, an intermediate body and an upper body securely joined in the order named, said lower body being in the form of a conical hopper having at its bottom an outlet for collected particles, said intermediate body being cylindrical in shape and having an inlet for particle-laden gas to flow into said intermediate body, said inlet being so opened that the particle-laden gas is caused to spiral or swirl in said intermediate body, said upper body being of frustro-conical form and having a top wall spaced apart from said inlet by a selected distance, a gas discharge pipe mounted within the upper end of said upper body and extending through an opening in said top wall of said upper body coaxially thereof, said pipe having an entrance within the upper end of said upper body and spaced above said inlet enabling a non-reversing gas flow path to be established between said inlet and entrance, and particle trapping chambers extending from said upper body proximate the said top wall thereof and communicating with said upper body through openings formed through the peripheral wall thereof so that while the particle-laden gas spirals upward in said intermediate and upper bodies the particles separated from the gas can be trapped and collected in said particle trapping chambers 2. A particle separator as claimed in claim 1 wherein said particle trapping chambers are tangentially and outwardly extended from said upper body.

3. A particle separator for particle-laden gas comprising:
  (a) an integral vertically disposed body structure including:
    (i) a lower body in the form of a conical hopper having an open top end, a closed bottom end and at its bottom end a discharge outlet for collected particles;
    (ii) an intermediate body in the form of an open ended cylinder with top and bottom ends, said intermediate body residing above and having its bottom end integrally joined to the open top end of said lower body so as to permit communication between said intermediate body and said lower body, an inlet in the lower side of said intermediate body for receiving particle-laden gas into said intermediate body and being mounted on said intermediate body so as to cause said entering particle-laden gas to spiral or swirl in said intermediate body;
    (iii) an upper body in the form of a frustro-conical cylinder and having an open bottom end integrally joined to the open top end of said intermediate body so as to permit communication between said upper body and said intermediate body, and having an integral top wall spaced above said intermediate body inlet by a selected distance; and
    (iv) plural trapping chambers forming outward and tangential integral extensions of said upper body and located immediately below and proximate said top wall, said trapping chambers communicating with the interior of said upper body through openings formed in the peripheral wall thereof and being adapted for receiving, trapping and collecting particles separated from said particle-laden gas and having at the bottom and outer extremities of said chambers discharge outlets for collected particles; and
  (d) a gas discharge pipe mounted within said upper body and extending upwardly through said top wall coaxially of said upper body and having an entrance thereto spaced above said inlet and disposed substantially opposite said chamber openings;

said inlet, selected distance, pipe entrance and chambers being operatively arranged such that a non-reversing gas flow path is established between said inlet and entrance and as particle-laden gas enters said intermediate body through said inlet, said gas and particles are spiraled upward within said intermediate and upper bodies and the particles separated therefrom for discharge through said discharge outlets and with the gas separated therefrom exiting through said gas discharge pipe.

* * * * *